United States Patent [19]

Cutler et al.

[11] Patent Number: 4,891,341
[45] Date of Patent: Jan. 2, 1990

[54] FINE-GRAINED CERAMICS AND METHOD FOR MAKING THE SAME

[75] Inventors: Raymond A. Cutler; Anil Virkar, both of Salt Lake City, Utah

[73] Assignee: Ceramatec, Inc., Salt Lake City, Utah

[21] Appl. No.: 142,347

[22] Filed: Dec. 28, 1987

Related U.S. Application Data

[63] Continuation of Ser. No. 4,814, Jan. 9, 1987, abandoned, which is a continuation of Ser. No. 778,252, Sep. 20, 1985, abandoned.

[51] Int. Cl.$^4$ .................. C04B 35/56; C04B 35/58
[52] U.S. Cl. ........................... 501/89; 501/87; 501/88; 501/93; 501/96; 501/127; 501/128; 204/66
[58] Field of Search .................. 501/87, 88, 89, 93, 501/96, 127, 128; 264/66

[56] References Cited

U.S. PATENT DOCUMENTS

| | | | |
|---|---|---|---|
| 2,886,454 | 5/1959 | Todd | 501/87 X |
| 3,143,413 | 8/1964 | Krapf | 501/96 X |
| 4,605,633 | 8/1986 | DeAngelis | 501/96 X |
| 4,605,634 | 8/1986 | DeAngelis | 501/96 X |
| 4,647,405 | 3/1987 | Debely | 501/96 X |

*Primary Examiner*—William R. Dixon, Jr.
*Assistant Examiner*—Karl Group
*Attorney, Agent, or Firm*—Trask, Britt & Rossa

[57] ABSTRACT

High surface area, submicron ceramic powders are synthesized by reducing an oxide in the presence of another metal (i.e., Mg, Al, Ca, and the like) and a source of carbon, nitrogen or boron to form a new oxide and a carbide, nitride (or carbonitride). or boride. The oxide phase can be leached out to leave submicron carbides, nitrides or borides. Alternatively milling of reacted powders allows intimate mixtures of uniform, fine grained ceramic powders to be prepared inexpensively. These multiple-phase composite powders can be formed into a body and densified using conventional techniques to form dense, fine-grained ceramic bodies. Alternatively, containment of unreacted powders and subsequent heating results in multiple-phase dense ceramics with unique microstures. Transformation toughening of composites is possible by adding zirconia or hafnia either before or after the powder synthesis step.

16 Claims, 2 Drawing Sheets

0.1mm ⊢⊣

0.1mm ⊢⊣

FINE-GRAINED CERAMICS AND METHOD FOR MAKING THE SAME

CROSS-REFERENCE TO RELATED APPLICATIONS

This application is a continuation of applicants' co-pending application Ser. No. 07/004,814 filed Jan. 9, 1987 which is a continuation of application Ser. No. 07/778,252 filed Sept. 20, 1985, both of which are now abandoned.

BACKGROUND OF THE INVENTION

1. Field

This invention relates to ceramics (powders or dense ceramic bodies) made by exothermic reactions and particularly to such ceramics which are fine-grained (i.e., submicron diameter particle sizes prior to densification).

2. Description of the Prior Art

Composites of titanium carbide (TiC) well dispersed in an $Al_2O_3$ matrix are used as replacements for WC-Co cutting tools in finish machining operations. Because of their high hardness (excellent wear resistance) and good microstructure (high surface finish due to fine grain size and low porosity), these composites are also used as substrates for thin film transducers in the computer industry and in other wear applications. These composites are formed by mixing submicron $Al_2O_3$ and TiC to form a homogeneous mixture and hot pressing the powder at temperatures near 1700° C. Hot pressing limits the economical fabrication to simple parts because expensive diamond grinding is required for making complex components from hot pressed billets. In addition, the useful range of applications for $Al_2O_3$-TiC composites is limited due to their brittle nature. Methods for achieving higher toughness would therefore increase the usefulness of these composites.

Silicon carbide is a prime candidate for making high temperature components due to its excellent oxidation and creep resistance. Currently, silicon carbide (SiC) components are fabricated by sintering submicron SiC powder, with B and C (or $B_4C$) or Al and C (or Al, B, and C) as sintering aids. The highly reactive submicron particle size is needed to make the powders sinterable. Commercial routes for making submicron SiC rely upon either the pyrolysis of silane compounds, or the carbothermal reduction of silica, followed by grinding. Other ceramics (i.e., TiC, TiN, $B_4C$, $TiB_2$, BN, TaC, WC, etc) are difficult to make as submicron powders but are useful for a variety of applications including wear parts, sputtering targets, electrodes, cutting tools, and armor. Clearly, a rapid, inexpensive method of making submicron powders would be an improvement in the art.

Various metals and alloys have been prepared for several decades by metallothermically reducing oxides. These reactions can be described in a general way as:

$$A + MO \rightarrow AO + M \tag{1}$$

wherein A is a metal, MO is a metal oxide, and AO and M are the metal oxide and metal, respectively, formed as a result of the exothermic reaction. The difference in density between the metal, M, and the metal oxide, AO, usually allow separation to occur when the heat generated by the reaction is high enough to melt one or both of the constituents. The synthesis of refractory cermets (ceramic-metal composites) and ceramic composites (porous mixtures of oxides, borides and carbides) by exothermic reactions was reported by Walton and Poulos (J. Am. Ceram. Soc., vol. 42, pp. 40–49, 1959). They showed that the heat generated by exothermic reactions to form cermets enabled a liquid phase to form and infiltrate the ceramic matrix.

The synthesis and densification of a wide range of ceramic and metallic materials by self-propagating, high temperature reactions has been reported in the Russian literature and has sparked renewed interest in exothermic reactions. Temperatures between 1500°–3500° C. have been measured during reactions involving a wide range of materials. These types of reactions are illustrated below:

$$M + X \rightarrow MX \tag{2}$$

wherein M is a metal and X is carbon, nitrogen, silicon, oxygen, or boron. This type of a reaction can be used to make powders as fine as 5 microns, although larger particle sizes generally result due to the high temperatures of the reaction. Pressure can be applied immediately after the reaction to densify ceramics which do not completely melt and cannot be cast. Previous researchers have not been able to synthesize submicron powders using the above technologies. In addition, there is no evidence in the literature that exothermic reactions have been used to product intimate mixtures of ceramics with microstructures which result in improved toughness. There is no evidence in the literature that pressureless sintering (densification accompanied by shrinkage) has been observed in any of the previous investigations. Since all of these features are desirable, the ability to make such ceramics would be an improvement in the art.

SUMMARY OF THE INVENTION

It is a primary object of the present invention to provide a rapid and inexpensive method for making multiple phase ceramic powders by exothermic reactions, where at least one phase is submicron in particle size.

It is yet another object of the invention to leach the oxide phase from the synthesized powder mixture and provide a method for making submicron carbides, nitrides, or borides.

It is another object of the present invention to provide a method for making multi-phase, high density ceramic composites with a uniform dispersion of phases.

It is still another object of the invention to make multi-phase, high density ceramic composites where the phases form interpenetrating networks randomly throughout the composite.

It is yet another object of the present invention to provide a method of transformation toughening the composites, independent of the microstructure obtained.

These and other objects of the present invention will become more fully apparent from the following description and appended claims.

DESCRIPTION OF THE PREFERRED EMBODIMENTS

Figure 1A:
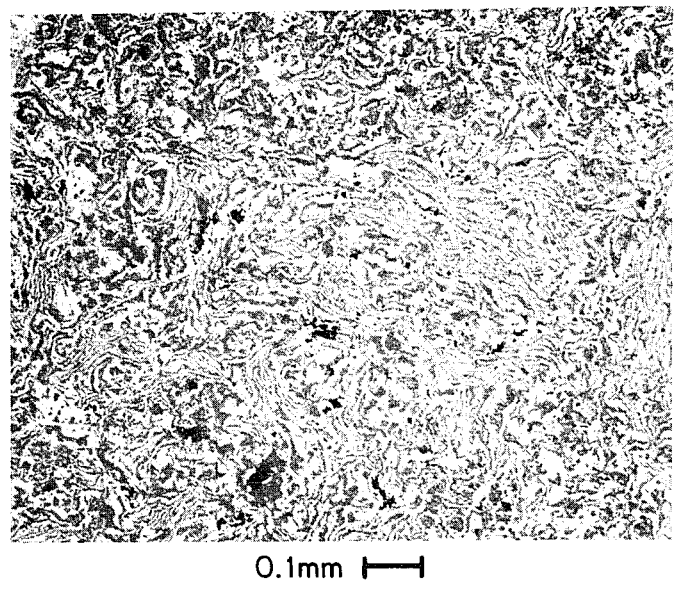
FIG. 1A is a photomicrograph at 100× of an embodiment of the invention prepared as described in Example I hereinafter.

Submicron carbides, nitrides, and borides can be formed by carrying out the following exothermic reaction:

$$MO + A + K \rightarrow MX + AO \qquad (3)$$

where MO and X are submicron oxides and carbon (or boron or nitrogen compounds) reactants, respectively, A is a metal reductant, and MX is the submicron carbide (or boride or nitride) product and AO is the new oxide formed. Suitable metal oxides (MO in Equation 3) include the oxides of silicon, titanium, boron, aluminum, chromium, vanadium, niobium, zirconium, hafnium, yttrium, lanthanum, molybdenum, tantalum, and tungsten (groups IVB, VB, and VIB of the periodic table plus B, Al, and Si are of prime interest). These oxides may be synthesized as submicron oxides or milled to produce submicron powders prior to mixture with the other components of the invention. A reducing agent (A in Equation 3), such as Mg, Si, Al, Ca, Na, Th, Be, Zr, or Ti, is used to remove the oxygen from the metal oxide while at the same time allowing carbon, nitrogen or boron (or compounds containing these elements) to form a stable ceramic without going though a molten intermediate state.

Stoichiometry in the final product is controlled by varying the stoichiometry of the reactants. For example, if substoichiometric TiC (i.e., $TiC_{0.85}$) is desired along with $Al_2O_3$, one simply adds a substoichiometric amount of C in combination with a stoichiometric amount of titanium dioxide. For compounds which are strictly stoichiometric, such as WC, substoichiometric C would result in the formation of a cermet containing free tungsten. Filler materials (i.e., inert materials not involved in the reaction) can be added to control the chemical composition of the final product as long as the reactions remain self-sustaining upon ignition. The $Al_2O_3$ content in $Al_2O_3$-TiC composite powders synthesized by this technique, for example, can have $Al_2O_3$ contents varying from 25% to 75% by volume of the mixture. Thus, a wide range of compositions can be produced using this invention.

The reactants can be mixed using conventional ceramic processing techniques in order to obtain a uniform dispersion of the oxide, metal, and carbon (or boron or nitrogen). The mixture can then be reacted as a loose powder or as a preformed compact in the shape of the final component.

Exothermic reactions are preferably carried out in vacuum or under a cover gas (i.e., Ar, $N_2$, or He) in order to avoid oxidation of the non-oxide product. Exothermic reactions, for the purpose of this invention, are defined as reactions which are self-sustaining (require no external heat) upon initiation. These reactions can be initiated by supplying heat locally (i.e., using an ignitor) or by uniformly heating the powder mixture. Initiation temperatures are near the melting point of the metal reactant (i.e., near 660° C. in the case of Al) but it is not necessary to melt the metal if its vapor pressure is high enough. For example, reactions involving Mg routinely ignite between 525° and 590° C., whereas the metal itself melts near 650° C. Temperatures reached during these exothermic reactions are controlled by the stoichiometry of the reaction, but are generally close (i.e., within 200° C.) to the adiabatic temperature predicted by thermodynamics. Reaction temperatures are generally above 2000° C. and below 3500° C. Since reaction times are very short (on the order of fractions of a second to a few seconds), grain growth is limited and submicron powders are synthesized from the submicron reactants. It is not necessary, however, for the metal (A in Equation 3) to be submicron since it melts as the reaction initiates.

Homogeneous powder mixtures are prepared by milling the reacted powders, followed by consolidation (i.e., pressureless sintering (i.e., sintering in the absence of applied external pressure), hot pressing, hot isostatic pressing, etc.). At least one phase (carbide, nitride, or boride) of the powder mixture is submicron before milling. Physical properties of the dense homogeneous composites are equal to or superior to composites of identical chemistry prepared by processing commercial powders.

Figure 1B:
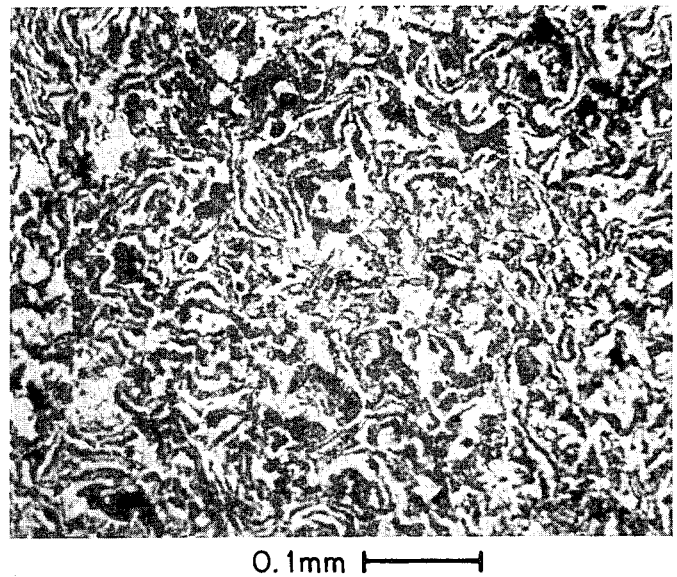
FIG. 1B is a 2× magnification of the photomicrograph of FIG. 1A to show the grain size and river structure.
Figure 2B:
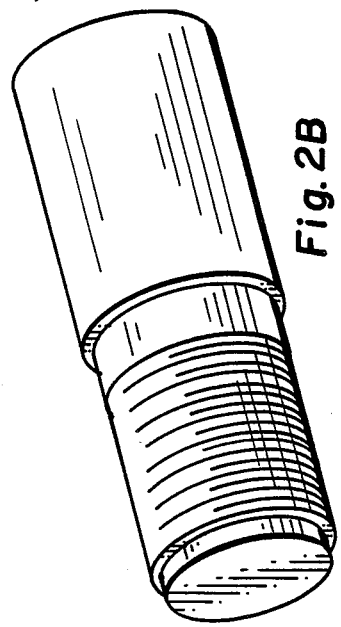
FIG. 2B is a screw cap which securely fits within the opening of the crucible illustrated in FIG. 2A.
Figure 2C:
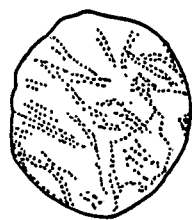
FIG. 2C is a graphite foil seal whch acts as a seal between the crucible contents and the screw cap.
Figure 2A:
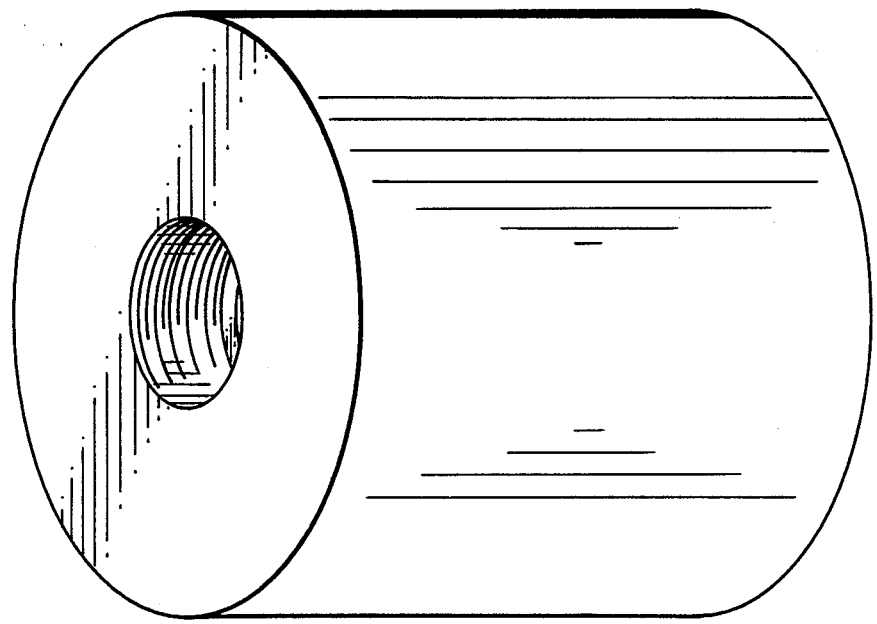
FIG. 2A is a graphite crucible utilized to contain unreacted powders and as a container for the reaction carried out as described in Example 3 hereinafter.

Unique microstructures (see FIG. 1) can alternatively be made by densifying the reacted powder in-situ (i.e., pressureless sintering inside a contained die (see FIG. 2), hot pressing, etc.) or conventionally densifying the reacted powder without milling. The unique microstructure is believed to result from the movement of the reaction front through the powder. The light phase in FIG. 1 is titanium carbide (etching revealed that the grain size is less than one micron in diameter) and the grey phase is alumina. These interconnected microstructures are believed to be desirable when the two phases have different Young's moduli or coefficients of thermal expansion so that crack deflection or crack pinning leads to increased fracture toughness. Other reseachers have shown that crack defection occurs in $Al_2O_3$-SiC (prepared conventionally with homogeneous dispersion of phases) and can increase the toughness by a factor of two. Example 2 suggests that unique microstructures give improved toughness.

Pressureless sintering of $Al_2O_3$-TiC made by exothermic reactions was demonstrated either using the closed crucible concept to produce unique microstructures (see Example 3) or using milled powders to make microstructures with a homogeneous dispersion of phases (see Examples 4 and 5). Pressureless sintering is a result of the fine particle size, preferably submicron, of the reacted powders and the carbon balance, preferably substoichiometric, during the reaction.

The toughening of ceramics due to the transformation of zirconia or hafnia particles from their metastable tetragonal to the monoclinic polymorph is well known in the art. It was not obvious, however, that zirconia (or hafnia) could be incorporated into the exothermic reaction scheme without grain growth which is undesirable since excessive microcracking occurs if zirconia particles are too large (greater than 2 to 3 microns). Examples 6 and 7 show that transformation toughening of oxide-carbide composites is possible by adding $ZrO_2$ as a filler material during the reaction and retaining the unique microstructures, or by milling $ZrO_2$ into the reacted powder which results in a uniform microstructure. Fracture toughness increases of greater than 50% are possible regardless of the method used to add zirconia.

Single phase submicron carbides, nitrides, or borides (or mixtures (carbonitrides) or solid solutions) can be made by leaching the oxide phase after the reaction. As described in Example 8, single phase beta silicon carbide was obtained by reacting amorphous silica with magnesium and carbon to form a mixture of silicon carbide and magnesium oxide as shown below:

$$SiO_2 + 2Mg + C \rightarrow SiC + 2MgO \qquad (4)$$

MgO was removed by leaching with HCl, where HCl reacts with MgO to form $MgCl_2$. The surface area of the acid leached (HCl followed by $HF\text{-}HNO_3$ and HF) powder was $45.8 \pm 1.6$ m$^2$/g. Assuming spherical particles, one calculates the SiC particle size to be near 0.02 microns in diameter. Electron microscopy showed that the synthesized SiC crystallites were 0.1 to 0.5 microns in diameter, showing an order of magnitude agreement with x-ray measurements and confirming the submicron grain size. A pycnometric density of 3.20 g/cc and x-ray diffraction confirmed that the powder was beta silicon carbide. Other materials can be made in a similar manner (see Example 9). Alternatively one can use caustic to remove the alumina phase. By employing a solid source of nitrogen it is possible to make carbonitrides (see Example 10) or SiC-AlN powders where the SiC is of the alpha polytype. Borides can also be produced by exothermic reactions (see Example 11).

EXAMPLE 1

Formation of Unique Microstructures

Commercially available $TiO_2$ (240 grams, Unitane 0-110 American Cyanamid (anatase)), Al (108 grams, Alcoa 123), and C (36 grams, Raven 2000, Columbian Chemical Co.) were ball milled together for 8 hours in 1500 ml hexane in a 15.2 cm diameter stainless steel mill with 1.5 kg WC-Co balls. The powders was air dried and 17.6 grams was loaded into a 25.4 mm diameter graphite die. The graphite die was loaded into a vacuum hot press and 13.8 MPa pressure was applied until the reaction initiated. A brief outgassing was noted at the time of the reaction and the maximum temperature indicated by a thermocouple located near the graphite die was 1350° C. Pressure was maintained as the sample cooled. The hot pressed sample had a density of 3.67 g/cc or approximately 85% of theoretical. The partially densified sample was then heated to 1900° C. under vacuum, without pressure, and held for 30 minutes. The $Al_2O_3$-TiC composite sintered and was over 98% of theoretical density. The microstructure (see FIG. 1) showed a unique microstructure of interlocking carbide and oxide phases. Etching of the TiC showed that the grain size was submicron.

EXAMPLE 2

Improved Toughness from Unique Microstructures

Alternative sources of titania (CTP, NL Industries), aluminum (Sargent Welch), and carbon (acetylene black, Gulf Oil Chemicals Co.) were prepared as in Example 1 except that the milling time was 16 hours. One hundred grams of the powder was wrapped loosely in graphite foil and heated to 1100° C. under 2 liters/minute (l/min) $N_2$. X-ray diffraction of the reacted powder showed that alpha alumina and titanium carbide had formed during the exothermic reaction. The reacted powder was loaded without subsequent milling into a graphite die (10.8 grams into each of four 12.95 mm diameter holes) and hot pressed at 1550° C. for 30 minutes with 34.5 MPa pressure under a 3 l/min $N_2$ cover gas. The microstructure of the hot pressed composite consisted of the unique interlocking microstructure. TiC (90 grams, Hermann Starck) and $Al_2O_3$ (210 grams, Reynold's HP DBM) were prepared conventionally by milling the powders and hot pressing at 1650° C. for 30 minutes as described above. The fracture toughness was determined on hot pressed 12.7 mm diameter by 19.1 mm long cylinders using the short-rod technique. The composites prepared using conventional powder had a fracture toughness of 3.2 MPa·m$^{-\frac{1}{2}}$ as compared to 4.8 MPa·m$^{-\frac{1}{2}}$ for composites with unique interlocking microstructures made using the exothermically produced powder.

EXAMPLE 3

Containment to Allow Pressureless Sintering and Unique Microstructures

A powder was prepared as in Example 1 except that Fisher A-559 Al and Raven 7000 carbon were substituted for Alcoa 123 and Raven 2000, respectively. The dried powder was pressed uniaxially to 122 MPa and loaded into a graphite crucible with a graphite foil seal and screw cap (see FIG. 2) to contain gases evolved during the exothermic reaction. The graphite crucible was heated in a tube furnace under 2 l/min $N_2$ gas to 1100° C. with no outward evidence of a reaction having occurred except that x-ray diffraction showed the mixture had changed from $TiO_2$, Al, and C to alpha $Al_2O_3$ and an apparent solid solution between TiC and TiO.

The sample was then pressureless sintered by heating to 1800° C. in 0.1 l/min He gas and holding at temperature for 30 minutes. The composite shrunk 22.2% on diameter during sintering and was over 95% dense. An optical micrograph showed similar river patterns in FIG. 1 and etching for 4 minutes in Murakami's solution showed that the TiC (x-ray diffraction showed that the TiO.TiC solid solution was now replaced TiC) grain size was submicron.

This example was duplicated using $Al_4C_3$ instead of Al and C to demonstrate that the reducing metal and the carbon source can be combined. The results were identical.

EXAMPLE 4

Pressureless Sintering of Exothermically Reacted and Milled Powder

Powder prepared as in Example 3 was pressed into four 25 gram pellets which were loosely wrapped in graphite foil and heated under flowing $N_2$ in a tube furnace until the reaction initiated (approximately 700° C.). The reacted powder was then ball milled to produce a good dispersion of TiC in $Al_2O_3$. The ball milled powder was precompacted and pressureless sintered at 1800° C. as in Example 3. The composite shrunk 19% on diameter and was over 97% dense. The microstructure clearly showed that ball milling destroys the interlocking microstructure and makes a homogeneous mixture of TiC in $Al_2O_3$.

EXAMPLE 5

Homogeneous Microstructure

The same constituents as in Example 1 were milled and the entire dried powder was loaded into a tube furnace and reacted uncontained under nitrogen as in Example 2. The powder reacted at 660° C. and resulted in a powder which was easily milled (additional 8 hours in the same ball mill) to give a uniform dispersion of TiC in Al$_2$O$_3$. X-ray diffraction of the reacted powder showed TiC and Al$_2$O$_3$ peaks at identical d spacings as those observed in commercially available TiC and Al$_2$O$_3$. No intermetallics or metals were observed in the x-ray diffraction pattern. The powder was hot pressed at 1750° C. for 10 minutes under 34.5 MPa pressure resulting in a material which was greater than 99% of theoretical density and exhibited four point bending strengths greater than 700 MPa. The microstructure consisted of a uniform dispersion of 0.5–5 micron TiC in Al$_2$O$_3$. Alternatively, commercial Al$_2$O$_3$ (Alcoa's A-16 S.G.) was added during the milling step to reduce the TiC content from 46 wt. % to 30 wt. %. Hardness, density, and strength of the sintered Al$_2$O$_3$-30 wt. % TiC were comparable to commercial cutting tools of the same composition made by hot pressing mixtures of commercially available Al$_2$O$_3$ and TiC.

EXAMPLE 6

Transformation Toughening of Al$_2$O$_3$SiC

Silica (90.13 grams, M5 Cab-O-Sil, Cabot Corp.), aluminum (53.96 grams, Alcoa 123), and carbon (18.02 grams Acetylene Black, Gulf Oil Chemicals Co.) were milled for 16 hours as in Example 1. The powder was then reacted as in Example 2 to form SiC and Al$_2$O$_3$. Zirconia (51.34 grams, Zircar ZPT) was milled with 149.44 grams of the reacted powder for an additional 8 hours to prepare a uniform dispersion of ZrO$_2$ in a homogeneous Al$_2$O$_3$-SiC powder. To show that ZrO$_2$ can be added as a filler during the reaction, 55.7 grams zirconia was added to an identical amount of SiO$_2$, Al, and C as described above during the pre-reaction milling step. X-ray diffraction showed that when the powder was then reacted as above, zirconia acts as a filler material with no conversion to zircon. The reacted powders were then hot pressed at 1750° C. for 15 minutes at 34.5 MPa in N$_2$ gas. The powders densified to greater than 99% of theoretical density and showed well dispersed and interlocking microstructures for the zirconia addition after the reaction and the zirconia filler addition, respectively. The hot pressed composites were compared with Al$_2$O$_3$-SiC prepared by exothermic reactions without any zirconia additions. As can be seen by the data in Table 1, the toughness of the two zirconia toughened materials were within one standard deviation of each other showing that substantial toughening is possible regardless of the method used for adding zirconia.

TABLE 1

Transformation Toughening of Al$_2$O$_3$—SiC Composites

| Composition (volume %) | Hardness (GPa) $\bar{x}$ | s | Fracture Toughness (MPa · m$^{-\frac{1}{2}}$) $\bar{x}$ | s |
|---|---|---|---|---|
| Al$_2$O$_3$—42SiC | 18.80 | 2.26 | 2.93 | 0.78 |
| Al$_2$O$_3$—34SiC—18ZrO$_2$ (ZrO$_2$ added as filler in reaction mixture) | 20.13 | 1.28 | 4.35 | 0.48 |
| Al$_2$O$_3$—34SiC—18ZrO$_2$ (ZrO$_2$ milled in after reaction) | 18.04 | 1.10 | 5.06 | 0.49 |

EXAMPLE 7

Transformation Toughening of Al$_2$O$_3$-TiC

Transformation toughened Al$_2$O$_3$-TiC was made by adding 20 weight percent ZrO$_2$ to a pre-milled mixture of Al$_2$O$_3$-34.7 TiC (30 volume percent TiC), milling the powder 8 hours as in Example 1, and hot pressing the dried powder as in Example 2. The fracture toughness of the densified composite was 6.0 MPa·m$^{-\frac{1}{2}}$, almost double the toughness of the composite with well dispersed TiC in Al$_2$O$_3$ (with no zirconia added).

EXAMPLE 8

Synthesis of Submicron SiC

A mixture of SiO$_2$ (30.05 grams, M-5 Cab-O-Sil), Mg (24.30 grams, MG-203, Atlantic Equipment Engineers), and C (6.00 grams, Raven 3500) were mixed using a high speed stirrer in 1500 ml heptane. The powder was air dried during mixing to keep the magnesium suspended in the silica-carbon gel. The powder was then pressed into four 15 grams pellets at 34.5 MPa and loosely wrapped in graphite foil. The compacted powder was reacted by heating in 3 l/min Ar until the reaction occurred (approximately 600° C.). X-ray diffraction showed that the reaction occurred as suggested in Reaction (4). The MgO was leached away by adding an excess of HCl (200 ml) and the MgCl$_2$ was removed by filtration. HF (50 ml) was used to remove unreacted silica and the powder was again filtered and washed with deionized water three times. X-ray analysis showed that the powder was beta SiC with substantial line broadening due to its submicron particle size. The pycnometric density was 3.20 g/cc, thereby confirming the formation of SiC powder. The surface area was measured by both single and triple point B.E.T. with results of 45.8 and 48.4 m$^2$/g, respectively. Assuming spherical particles, this translates to a SiC particle size of 0.02 microns. The small particle size was confirmed by transmission electron microscopy.

EXAMPLE 9

Synthesis of Submicron TiC

TiO$_2$ (240 grams, Unitane 0-110), Mg (146 grams, MG-130) and C (36 grams, Raven 410) were ball milled for 16 hours as in Example 1. The powder was reacted and acid leached as in Example 8, except no HF was used in the MgO removal step. X-ray diffraction confirmed the existence of TiC. Surface area measurements (22 m$^2$/g) and scanning electron microscopy showed that the TiC was submicron in size.

EXAMPLE 10

Synthesis of Al$_2$O$_3$-TiC$_x$N$_{1-x}$

Titania and alumina, as in Example 1, were milled with NaCN (73.5 grams, Fisher S-284) and 100 grams of the dried powder was reacted in loose graphite foil as in Example 2. X-ray diffraction confirmed that the reaction occurred as predicted:

$$3TiO_2 + 4Al + 1.5NaCN \rightarrow 3TiC_{0.5}N_{0.5} + 2Al_2O_3 + 1.5Na \qquad (5)$$

The sodium volatilized off during the reaction leaving a powder which was a mixture of Al$_2$O$_3$ and titanium carbonitride. This example shows that it is possible to make solid solutions of carbides and nitrides by exothermic reactions. Alternatively, magnesium could have been substituted for aluminum if a single phase material were desired by acid leaching.

EXAMPLE 11

Synthesis of Al$_2$O$_3$-TiB$_2$

Titania (77.90 grams, CTP), aluminum (35.97 grams, Fischer A-559), and boron (21.62 grams Atlantic Equipment Engineers) were ball milled for 19 hours as in Example 1. The powder was reacted as in Example 2. X-ray diffraction showed that the reaction occurred as predicted:

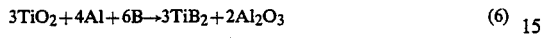

$$3TiO_2 + 4Al + 6B \rightarrow 3TiB_2 + 2Al_2O_3 \qquad (6)$$

The loose powder partially sintered into agglomerates during the highly exothermic reaction. No further characterization of the reacted powder was made.

The present invention is unique in the following respect:

1. Submicron oxide and/or carbon (or nitrogen, boron, or mixtures of these components) raw materials allow the synthesis of submicron carbides, nitrides, and borides. Electron microscopy also suggests that the oxide phase is submicron as well. Single phase materials can be made by leaching the oxide phase from the composite. Submicron powders prepared by exothermic reactions are an attractive alternative to conventional methods for making submicron powders. Other methods for making ceramics by exothermic reactions have not resulted in submicron powders.

2. Unique microstructures (interpenetrating oxide-carbide network, see FIG. 1) result in oxide-carbide composites due to the nature of the propagating front in the exothermic reactions. These microstructures may give improved toughness due to crack deflection or cracking pinning. Alternatively, microstructures with well dispersed phases can be made by milling the powder after the reaction. Properties of powders by the economical exothermic reaction are improved or comparable with powders made by more costly techniques.

3. Transformation toughening is possible by adding zirconia (or hafnia) either during the reaction as a filler material or after the reaction. Again, the microstructure of the densified composite can be controlled. Fracture toughness increases of greater than 50% were observed for the SiC-Al$_2$O$_3$ and TiC-Al$_2$O$_3$ systems.

4. Pressureless sintering of exothermically prepared Al$_2$O$_3$-TiC is possible by either containing the powder during the reaction within a relatively impermeable container (i.e., graphite as in FIG. 2, boron nitride, etc.) to contain transient gases or by heating previously reacted powder which has been pre-compacted above 1600° C. Since pressureless sintering is a much more economical than hot pressing, this represents an improvement in the art.

Numerous variations and modifications can be made without departing from the invention. For example, submicron silicides could be made using the same approach. Accordingly, it should be clearly understood that the form of the invention described above is illustrative only and is not intended to limit its scope.

What is claimed is:

1. A method of making fine grained dense ceramics comprising the steps of: forming a mixture consisting essentially of submicron powders of
(a) an oxide of and element, said element selected from the group consisting of silicon, titanium, boron, aluminum, chromium, vanadium, niobium, zirconium, hafnium, yttrium, lanthanum, molybdenum, tantalum, and tungsten, (b) a reducing metal selected from the group consisting of silicon, magnesium, aluminum, calcium, sodium, thorium, beryllium, zirconium, or titanium, and (c) an element selected from the group consisting of carbon, nitrogen, and boron; initiating an exothermic reaction of the powder mixture; and pressurelessly sintering said exothermically reacted mixture to form a sintered product having a density greater than 95% of theoretical density.

2. The method according to claim 1 wherein said element is nitrogen present as a solid.

3. The method according to claim 1 wherein the reducing metal and the carbon, nitrogen or boron component are present as a compound.

4. The method according to claim 1 wherein said oxide is a mixture of oxides.

5. The method according to claim 1 wherein an inert filler material is added to the mixture prior to the initiation of an exothermic reaction.

6. The method according to claim 1 wherein the submicron powders are contained during the exothermic reaction.

7. The method according to claim 1 wherein the mixture is loaded and sealed into a crucible prior to the initiation of the exothermic reaction.

8. The method according to claim 1 wherein the exothermically reacted mixture is milled prior to the pressureless sintering.

9. The method according to claim 1 including the step of transformation toughening said exothermically reacted mixture.

10. The method according to claim 9 wherein said transformation toughening step includes adding zirconia or hafnia to the exothermically reacted mixture prior to sintering.

11. The method according to claim 9 wherein zirconia or hafnia is added as a filler during heating of the mixture to the initiation of an exothermic reaction.

12. The method according to claim 1 wherein any oxide in said reacted mixture is leached prior to sintering.

13. The method according to claim 1 wherein said sintering occurs at a temperature between 1500° and 2400° C.

14. The method according to claim 1 wherein the sintered product has a grain size of less than 10 microns.

15. The method according to claim 1 wherein the sintered product has a grain size of less than 5 microns.

16. The method according to claim 1 wherein the sintered product has a grain size of less than 1 micron.

* * * * *

UNITED STATES PATENT OFFICE
CERTIFICATE OF CORRECTION

Patent No. 4,891,341         Dated   January 2, 1990

Inventor(s)    Cutler et al.

It is certified that error appears in the above-identified patent and that said Letters Patent is hereby corrected as shown below:

In column 1, line 39, after "carbide" insert therefore --("SiC")--

In column 10, line 7, change "and' to --an--.

Signed and Sealed this

Fourth Day of August, 1992

Attest:

DOUGLAS B. COMER

*Attesting Officer*     Acting Commissioner of Patents and Trademarks